United States Patent [19]
Nishizawa et al.

[11] Patent Number: 5,659,832
[45] Date of Patent: Aug. 19, 1997

[54] VARIABLE CAMERA VIEWFINDER CORRESPONDING TO VARIABLE CAMERA APERTURE

[75] Inventors: Akio Nishizawa, Kawasaki; Hiroshi Terunuma, Yachiyo; Isao Soshi; Noriyasu Kotani, both of Tokyo, all of Japan

[73] Assignee: Nikon Corporation, Tokyo, Japan

[21] Appl. No.: 575,033

[22] Filed: Dec. 19, 1995

[30] Foreign Application Priority Data

Dec. 20, 1994 [JP] Japan .................................. 6-316181

[51] Int. Cl.$^6$ ........................................ G03B 17/02
[52] U.S. Cl. ................................................ 396/435
[58] Field of Search ................ 354/94, 159, 222; 396/435, 436, 378, 380

[56] References Cited

U.S. PATENT DOCUMENTS

| 4,583,831 | 4/1986 | Harvey | 354/106 |
|---|---|---|---|
| 5,227,824 | 7/1993 | Yoshida et al. | 354/159 |
| 5,252,055 | 10/1993 | Cho et al. | 354/222 |
| 5,357,298 | 10/1994 | Imai et al. | 354/159 |
| 5,493,356 | 2/1996 | Tokui | 354/159 |

FOREIGN PATENT DOCUMENTS

| 2170149 | 6/1990 | Japan . |
|---|---|---|
| 4158345 | 6/1992 | Japan . |
| 6266003 | 9/1994 | Japan . |
| 6273826 | 9/1994 | Japan . |
| 6-250283 | 9/1994 | Japan . |

*Primary Examiner*—Safet Metjahic
*Assistant Examiner*—Nicholas J. Tuccillo

[57] ABSTRACT

A camera selects one of three or more photograph image sizes to be printed while a viewfinder provides a visual display corresponding to the selected one photograph image size. The camera includes a photographic optical system which focuses a subject on a camera film. A control unit is incorporated within the camera to select first print size information, second print size information, and third print size information. A viewfinder within the camera verifies the field to be printed on the photographic film while a display inside the viewfinder corresponds to the selected photograph image size. Print size selection switches select the print size and the control unit selects the print size information in response thereto. A plurality of aperture blades disposed within the camera define an aperture frame. First and second aperture blades move inwardly to define a horizontally oblong photograph image size and third and fourth aperture blades move inwardly to define a vertically oblong photograph image size. All aperture blades move outwardly to define a standard image size. A plurality of liquid crystal display segments are disposed within the viewfinder to define a variable viewing area corresponding to the selected image sizes. A control unit selects the image size in response to a switch.

20 Claims, 7 Drawing Sheets

VARIABLE CAMERA VIEWFINDER CORRESPONDING TO VARIABLE CAMERA APERTURE

BACKGROUND OF THE INVENTION

1. Field of the Invention

The present invention relates to a viewfinder display for an optical device. More particularly, the present invention relates to a camera viewfinder display which corresponds to a selected aperture setting.

2. Description of the Related Art

Conventional optical devices such as the Kyocera Lynx 90 camera incorporate technology for varying a viewfinder display. On the other hand, a number of conventional cameras are configured to produce variable size prints such as half-size prints and panorama size prints. Conventional cameras however, fail to provide for switching a display inside a viewfinder to correspond to the above photograph sizes. Therefore, photographers using conventional cameras are not able to determine through the viewfinder a range which will be printed in an actual photograph even though different photograph sizes are available.

SUMMARY OF THE INVENTION

It is therefore an object of the present invention to display a range inside a viewfinder which corresponds to at least three photograph sizes to be printed when different photograph sizes are available.

It is a further object of the present invention to display a range inside a camera viewfinder which corresponds to a photographic area to be printed such as a standard size, a half size and a panorama size.

It is still a further object of the present invention to switch between at least three photograph image sizes and corresponding visual display sizes.

Objects of the invention are achieved through a camera producing at least three photograph image sizes including a viewfinder, a switch which selects a photograph image size from the at least three photograph image sizes and a first optical segment disposed within the viewfinder and responsive to the switch to define a viewing area corresponding to the selected photograph image size.

Objects of the invention are also achieved through a camera including first and second optical segments disposed within a viewfinder and responsive to a switch to define a viewing area corresponding to a selected photograph image size, wherein the optical segments are disposed on alternate sides of the viewfinder and simultaneously respond to the switch to define the viewing area.

Objects of the invention are further achieved through a camera having first, second, third and fourth optical segments disposed on alternate right and left sides and top and bottom of a viewfinder and responsive to a switch to define a viewing area corresponding to the selected photograph size, wherein the first, second, third and fourth optical segments are selectively transparent.

Objects of the invention are further achieved through a camera having a viewfinder producing at least three photograph image sizes including a switch which selects a photograph image size from the at least three photograph image sizes, a plurality of aperture blades responsive to the switch and cooperating to define an aperture frame having a varying size corresponding to the selected photograph image size, and a plurality of optical segments disposed within the viewfinder and responsive to the switch to define a viewing area having a varying size corresponding to the selected photograph image size.

Objects of the invention are further achieved through a camera having a plurality of aperture blades including first, second, third and fourth aperture blades respectively disposed from top, bottom, right and left sides of a defined aperture frame, wherein the first and second aperture blades move inwardly to define a horizontally oblong photograph image size and the third and fourth aperture blades move inwardly to define a vertically oblong photograph image size, and a control unit connected to the switch which controls movement of the first, second, third and fourth aperture blades, a first motor responsive to the control unit which cooperatively moves the first and second aperture blades to define the horizontally oblong photograph image, and a second motor responsive to the control unit which cooperatively moves the third and fourth aperture blades to define the vertically oblong photograph image.

Moreover, objects of the invention are achieved through a camera having a viewfinder producing at least three photograph image sizes including a switch selecting a photograph image size from the at least three photograph image sizes, first, second, third and fourth moveable aperture blades cooperating to define an aperture frame having a varying size and corresponding to the selected photograph image size, wherein said first and second aperture blades are disposed on alternate sides of the aperture frame and said third and fourth aperture blades are disposed on alternate sides of the aperture frame, and first, second, third and fourth liquid crystal segments disposed within the viewfinder and responsive to the switch define a plurality of viewing areas corresponding to the at least three photograph image sizes, and wherein the first and second liquid crystal segments are disposed on alternate sides of the viewfinder and the third and fourth liquid crystal segments are disposed on alternate sides of the viewfinder.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
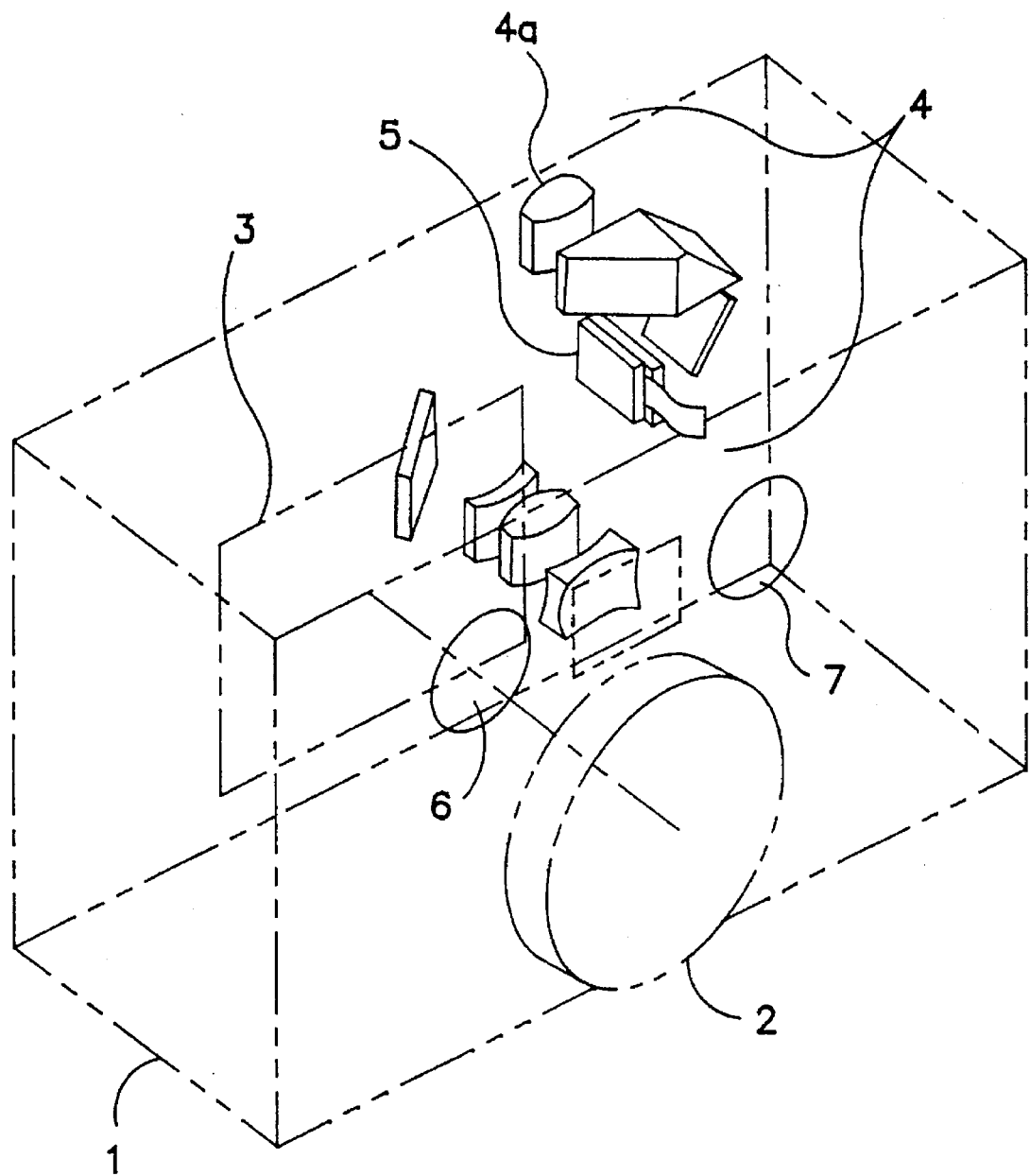
FIG. 1 is an elevated perspective view of a camera illustrating an optical system according to an embodiment of the present invention.

Reference will now be made in detail to the preferred embodiments of the present invention, examples of which are illustrated in the accompanying drawings, wherein like reference numerals refer to like elements throughout.

FIG. 1 illustrates a configuration of a camera 1 according to a first embodiment of the present invention. Camera 1 is configured for the installation of silver salt film and includes photographic optical system 2 for focusing a subject image thereon. Optical system 2 includes a number of lenses, etc. Camera 1 also includes aperture 3 which is simply a frame for casting light which has passed through photographic optical system 2 onto the silver salt film. Aperture 3 provides an opening which changes in size to define an amount of light passing therethrough.

Camera 1 also includes viewfinder optical system 4 for informing a photographer of a field range which is actually to be photographed onto the silver salt film. The photographer is able to determine the field range to be photographed by looking into viewfinder 4a. Camera 1 also includes LCD display 5 which is a liquid crystal display device viewed by the photographer from viewfinder 4a.

Camera 1 is also able to perform rangefinding according to an active rangefinding method. To initiate rangefinding according to an embodiment of the invention, an autofocus ("AF") photoemitter 6 first casts light rays onto a subject. An AF photoreceptor 7 then receives the light which has been released by AF photoemitter 6 and reflected from the subject. Optical system 2 then adjusts the lenses therein in response to the received light from AF photoreceptor 7.

Figure 2:
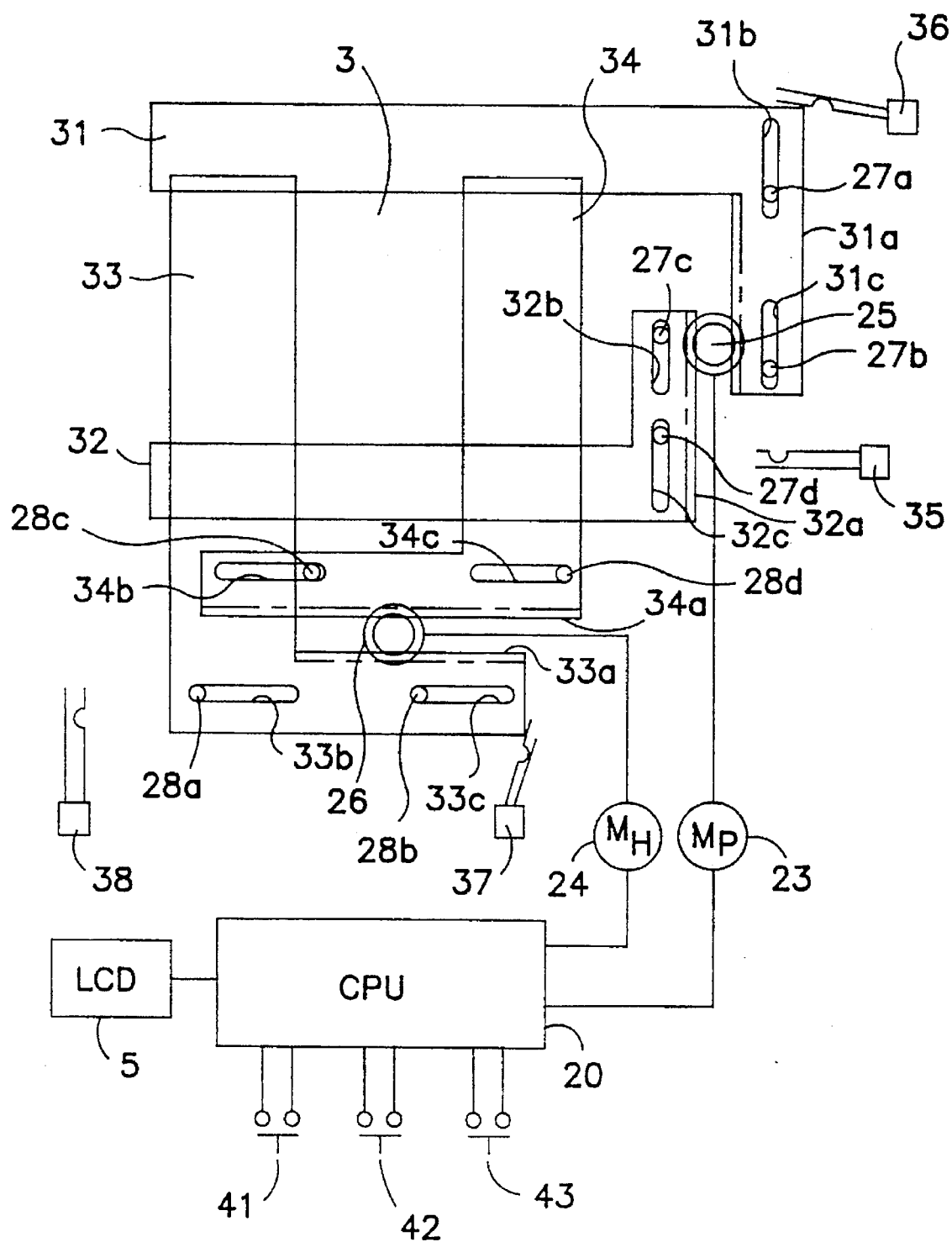
FIG. 2 is a diagram illustrating a plurality of aperture blades movable in response to a CPU according to an embodiment of the present invention.

Next, FIG. 2 is a diagram illustrating a plurality of aperture blades 31–34 which are movable in response to a command from a CPU 20 for changing the size of aperture 3. CPU 20 controls each of the aperture blades to cooperate and move within camera 1.

Aperture 3 is selectively operable through movement of aperture blades 31–34 to transmit at least three photographic image sizes onto the silver salt film. The plurality of transmitted photographic image sizes are then transformed by a photographic lab into a plurality of corresponding photographic prints. In the following explanations, the word "upper" shall refer to the top of FIG. 2, i.e. the top of a photographic print taken in a horizontal position.

Figure 7:
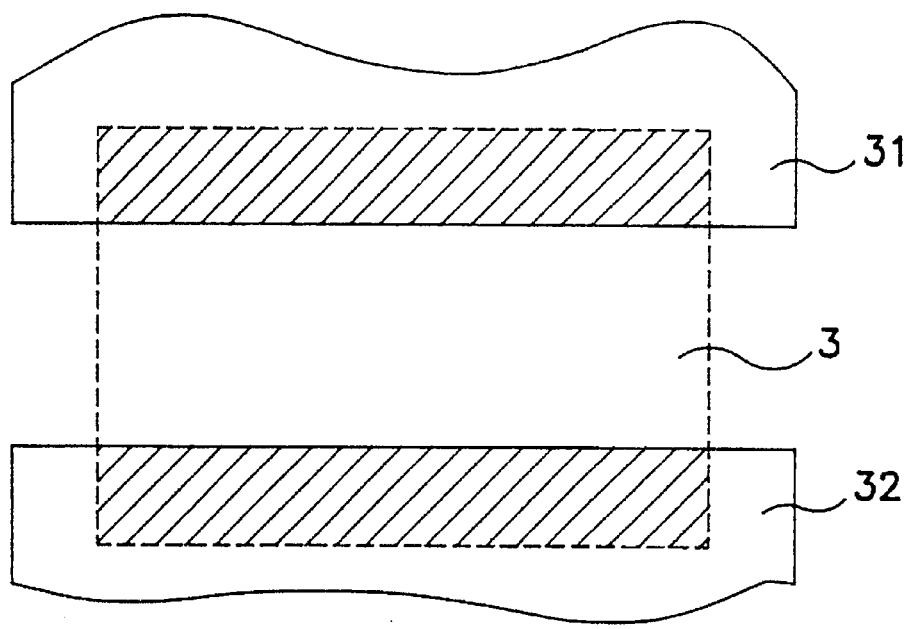
FIG. 7 is a diagram illustrating aperture blade positions which are used in panorama size photography.

Aperture blades 31 and 32 are disposed on alternate upper and lower sides of aperture 3 to vary the opening thereof between a standard and panorama size. Aperture blade 31 has rack 31a with guide holes 31b and 31c disposed therein. Also, aperture blade 32 has rack 32a with guide holes 32b and 32c disposed therein. In order to vary the opening of aperture 3 from the standard size to the panorama size, aperture blade 31 is lowered and aperture blade 32 is raised. Aperture blades 31 and 32 define the panorama size as illustrated in FIG. 7.

When the opening of aperture 3 is set to the panorama size, photography onto the silver salt film is thereby performed with the panorama size. Photography with the "panorama size" means specifying the print size as the panorama size. In this instance, a photo finishing laboratory prints the photograph with the panorama size based upon panorama size specification information, that is, based upon the fact that the upper end and the lower end of the film frame are not photographed. The panorama size is one of a number of horizontally oblong sizes having the top and bottom sides of the photograph image longer than the right and left sides.

Aperture blades 33 and 34 are disposed on alternate right and left sides of aperture 3 to vary the opening thereof between the standard size and a half size. Aperture blade 33 has rack 33a with guide holes 33b and 33c disposed therein. Also, aperture blade 34 has rack 34a with guide holes 34b and 34c disposed therein. In order to vary the opening of aperture 3 from the standard size to the half size, aperture blade 33 is shifted to the right and aperture blade 34 is shifted to the left. Aperture blades 33 and 34 are illustrated in the half size position in FIG. 8.

When the opening of aperture 3 is in the half size position, photography onto the silver salt film is thereby performed with the half size. Photography with the "half size" means specifying the print size as half a standard print size. In this case, the photo finishing laboratory prints the photograph with the half size based upon half size specification information, that is, based upon the fact that a horizontal length of one frame of the film is almost half the size of a standard photograph size. The half size is one of a number of vertically oblong sizes having the right and left sides of the photographic image longer than the top and bottom sides.

When photographing in the standard size, aperture blades 31 and 34 are both withdrawn to the outside, and thereby set to the standard size. Through this operation, the size of the opening of aperture 3 becomes a maximum. When the opening of aperture 3 is set to the standard size, photography onto the silver salt film is thereby performed with a standard size. Photography with the "standard size" means specifying the print size as the standard size. The photo finishing laboratory prints the photograph with the standard size based upon standard size specification information, that is, based upon the fact that there is a photographic image over the entire range of the film frame.

Motor 23 drives aperture blades 31 and 32 between the standard size and the panorama size. To drive aperture blades 31 and 32, motor 23 drives gear 25 which thereby meshes with rack 31a and rack 32a. The driving force of motor 23 is then transferred to aperture blades 31 and 32.

As shown in FIG. 2, guide hole 31b is configured to fit about guide shaft 27a, while guide hole 31c is configured to fit about guide shaft 27b. The motion of aperture blade 31 is thereby defined by guide shafts 27a and 27b, and guide holes 31b and 31c.

In the same way, as illustrated in FIG. 2, the motion of aperture blade 32 is defined by guide shafts 27c and 27d, and guide holes 32b and 32c. The motion of aperture blade 33 is defined by guide shafts 28a and 28b, and guide holes 33b and 33c. The motion of aperture blade 34 is also defined by guide shafts 28c and 28d, and guide holes 34b and 34c.

Motor 24 drives aperture blades 33 and 34 between the standard size and the half size. To drive aperture blades 33 and 34, motor 24 drives gear 26 which thereby meshes with rack 33a and rack 34a. The driving force of motor 23 is then transferred to aperture blades 33 and 34.

Detecting switch 35 is a switch for detecting that aperture blades 31 and 32 are in the panorama size. Detecting switch 36 is a switch for detecting that aperture blades 31 and 32 are in the standard size position. Detecting switch 37 is a switch for detecting that aperture blades 33 and 34 are in the half size position. Detecting switch 38 is a switch for detecting that aperture blades 33 and 34 are in the standard size position.

There are three screen switches, standard size switch 41, panorama size switch 42, and half size switch 43. Standard size switch 41 is a switch for selecting a standard size mode through operation by a photographer. Panorama size switch 42 is a switch for selecting a panorama size mode through operation by the photographer. Half size switch 43 is a switch for setting a half size mode through operation by the photographer.

CPU 20, illustrated in FIG. 2, is a control means which drives print size input setting means, i.e. motors 23–24, gears 25–26 and aperture blades 31–34, in response to a first print size being selected by print size selection switches 41–43. CPU 20 prints photograph size information to the film and causes LCD display 5 to provide a first display which corresponds to the first print size.

CPU 20 also drives the print size input setting means in response to a second print size being selected by print size selection switches 41–43. CPU 20 then sets the second print size information on the film and causes LCD display 5 to provide a second display which corresponds to the second print size.

Further, CPU 20 drives the print size input setting means in response to a third print size being selected by print size selection switches 41–43. CPU 20 then sets the third print size information on the film and causes LCD display means 5 to provide a third display which corresponds to the third print size. For this reason it is possible for the photographer to simply check what portion inside the viewfinder is to be printed on the photograph even when there are three or more photograph sizes.

Photographic optical system 2 focuses a subject on the fill disposed within camera 1. Print size input setting means, i.e. switches 41–43, select the first print size information, the second print size information, and the third print size information for determining a print size to be printed on the film. Viewfinder 4a outlines an area which corresponds to a field range to be printed on the film.

Figure 3:
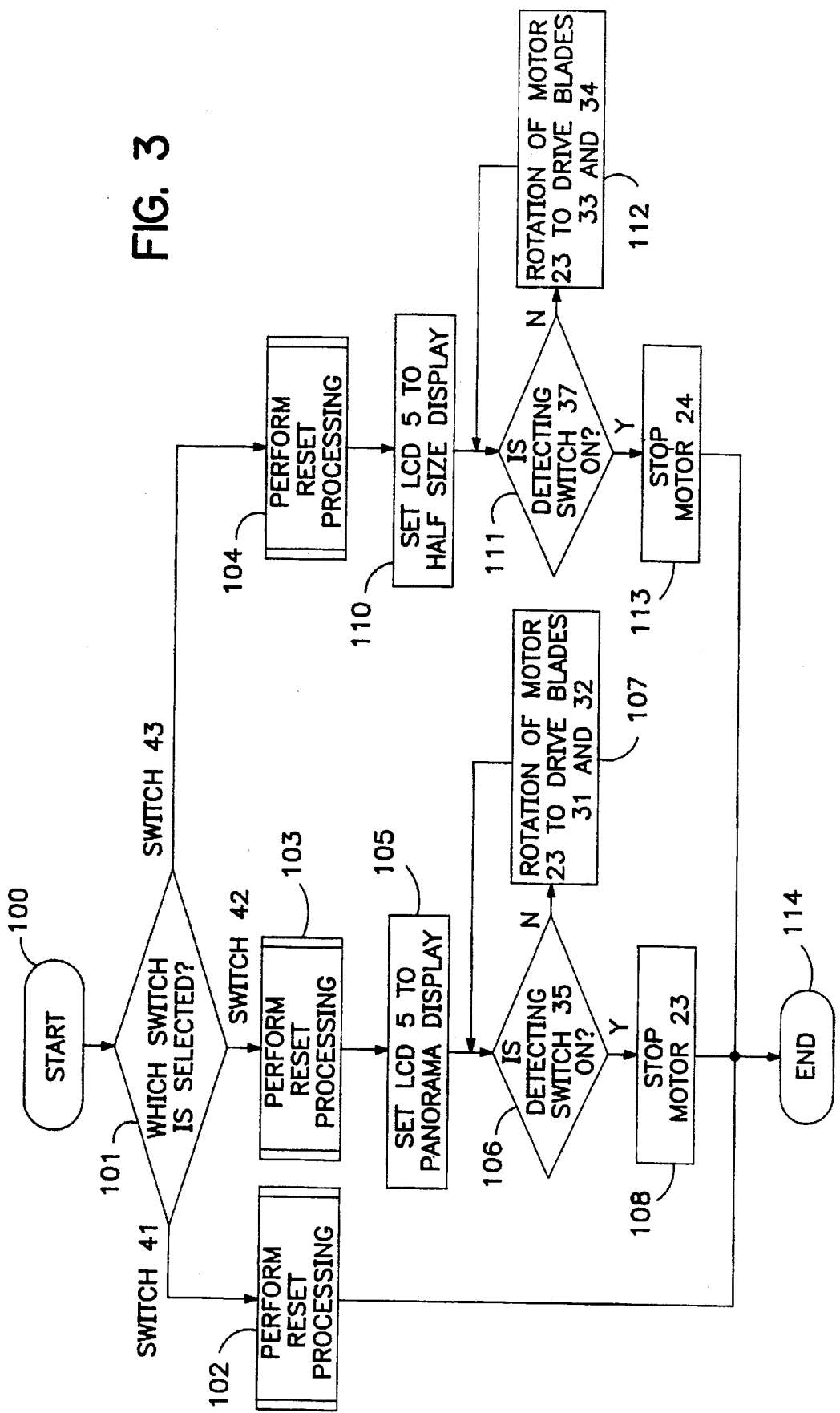
FIG. 3 is a flowchart illustrating camera switching control of at least three photograph image sizes according to an embodiment of the present invention.

FIG. 3 illustrates a flowchart for control of the viewfinder optical system. CPU 20 executes switching control of viewfinder optical system 4, according to a first embodiment of the present invention, between the standard size, panorama size and half size. The flowchart of FIG. 3 starts when any of switches 41, 42 and 43 is turned ON.

The switching control flowchart of FIG. 3 starts with step 100 and proceeds to step 101. In step 101, a determination is made as to which of the switches 41, 42, and 43 has been mined ON. In step 101, when switch 41 has been turned ON, the standard size mode is selected and flow proceeds to step 102. When switch 42 has been mined ON, the panorama size mode is selected and flow proceeds to step 103. When switch 43 has been turned ON, the half size mode is selected and flow proceeds to step 104.

Figure 4:
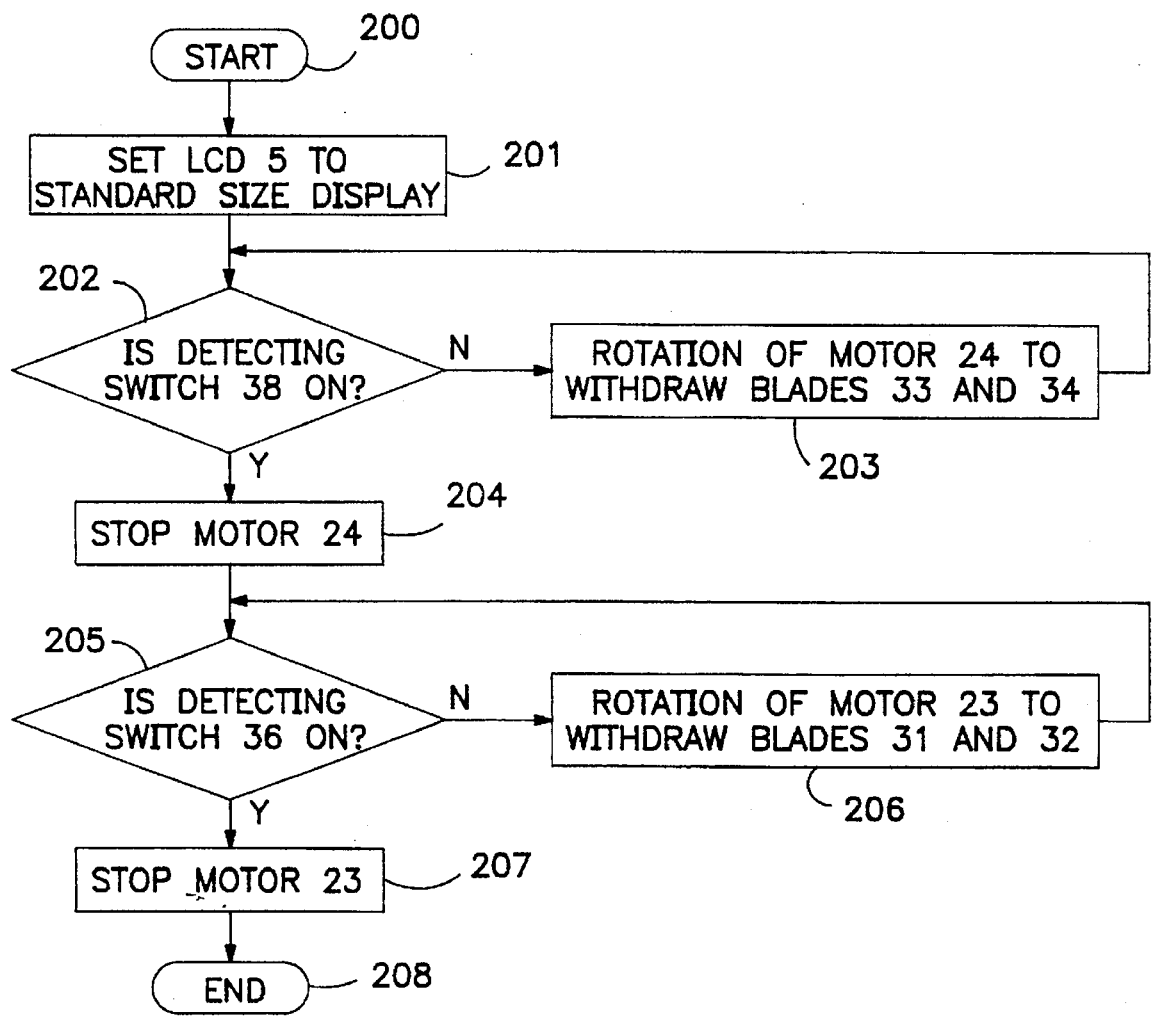
FIG. 4 is a flowchart illustrating reset processing control of a camera optical system according to an embodiment of the present invention.

In FIG. 4, the reset processing of steps 102, 103 and 104 is illustrated. In FIG. 4, flow of the reset processing begins with step 200. Flow then proceeds to step 201 wherein LCD 5 is set to the standard size display. More specifically, segments 51–54 are all mined OFF. At this time, nothing is displayed inside the viewfinder 4a with the exception of AF target 50.

Next, flow proceeds to step 202, and a determination is made as to whether detecting switch 38 is ON. When a determination is made in step 202 that detecting switch 38 is OFF, flow proceeds to step 203. In step 203, motor 24 is driven so that aperture blades 33 and 34 are withdrawn toward the outside, and flow cycles through step 202 until detecting switch 38 is ON, i.e. YES. When it is detected in step 202 that detecting switch 38 is ON, flow proceeds to step 204 and motor 24 is stopped.

Next, flow proceeds to step 205 wherein a determination is made as to whether detecting switch 36 is ON. When there is an OFF determination in step 205, flow proceeds to step 206. In step 206, motor 23 is driven so that aperture blades 31 and 32 are withdrawn. Flow then cycles through steps 205 and 206 until detecting switch 36 is ON, i.e. YES.

When there is an ON determination in step 205, flow proceeds to step 207 and motor 23 is stopped. Flow then proceeds to END at step 208. Once reset processing has ended in either of steps 102, 103 and 104 in FIG. 3, the resetting of the size of aperture 3 is finished and flow continues as outlined.

When panorama size switch 42 is detected in step 101, a panorama size mode determination is made, and flow proceeds to step 103. Reset processing is performed in step 103 as illustrated in FIG. 4. This reset processing is the same as in step 102, and an explanation has been therefore omitted.

Upon completion of reset processing of step 103, flow proceeds to step 105 and LCD 5 is set to a panorama display. More specifically, segments 51 and 52 are turned ON for display. Through the display of segments 51 and 52, the photographer can determine that the camera is set to the panorama size mode. Also, with the panorama display, it is possible to determine which section inside the viewfinder will be photographed.

Next, flow proceeds to step 106 and a determination is made as to whether detecting switch 35 is ON. If detecting switch 35 is OFF in step 106, i.e. NO, flow proceeds to step 107. In step 107, motor 23 is driven so that aperture blades 31 and 32 go to the panorama size. Then, when a YES determination is made in step 106, flow proceeds to step 108 while aperture 3 becomes as shown in FIG. 7. In step 108, motor 23 is stopped, and flow proceeds to END at step 114.

When half size switch 43 is turned ON in step 101, a half size mode determination is made and flow proceeds to step 104. Reset processing is then performed in step 104 as illustrated in FIG. 4. This reset processing is the same set forth in step 102, and an explanation is therefore omitted.

When reset processing of step 104 is completed, flow proceeds to step 110 and LCD 5 is set to the half size display. More specifically, segments 53 and 54 are turned ON for display. Through the display of segments 53 and 54, a photographer can determine that the camera is in half size mode. Also, through this display in half size mode, it is possible to determine which section inside the viewfinder will be photographed.

Figure 8:
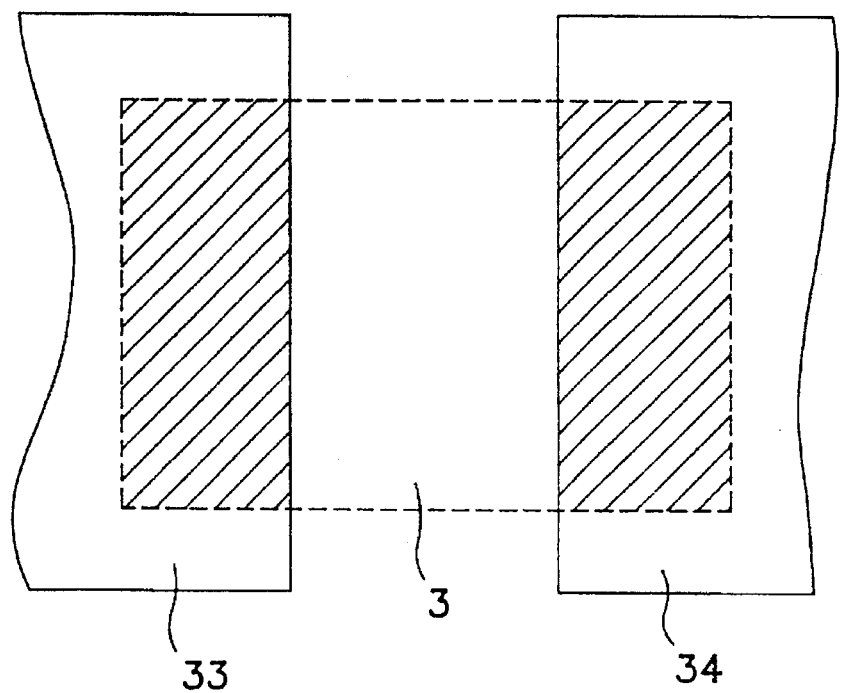
FIG. 8 is a diagram illustrating aperture blade positions which are used in half size photography.

Next, flow proceeds to step 111 and a determination is made as to whether detecting switch 37 is ON. If detecting switch 37 is OFF in step 111, i.e. NO, flow proceeds to step 112. In step 112, motor 24 is driven so that aperture blades 33 and 34 are driven into the half size position. Then, when a YES determination is made in step 111, flow proceeds to step 113. The opening of aperture 3 at this time becomes as shown in FIG. 8. In step 113, motor 24 is stopped and flow proceeds to END at step 114.

Next, LCD display 5 according to a first embodiment will be explained with reference to FIG. 5. LCD display 5 is seen by the photographer from viewfinder 4a. LCD display 5 provides a display inside the viewfinder 4a which corresponds to the print size. Print size selection switches 41–43 select the print size, and CPU 20 provides the print size information set to the film. LCD display 5 provides a display which corresponds to the print size. Segments 51–54 are liquid crystal segments of LCD display 5 and are displayed in black when they are turned ON and transparent when they are turned OFF. Segments 51 and 52 are disposed on alternate upper and lower sides of viewfinder 4a while segments 53 and 54 are disposed on alternate right and left sides of viewfinder 4a.

AF target 50 is also seen within viewfinder 4a, which shows the photographer a standard location where rangefinding is being performed. A subject is observed by the photographer through viewfinder 4a as overlapping with AF target 50. Next, AF photoemitter 6 emits a ray directed toward the subject overlapping AF target 50 and the reflected ray is received by AF photoreceptor 7.

Figure 5:
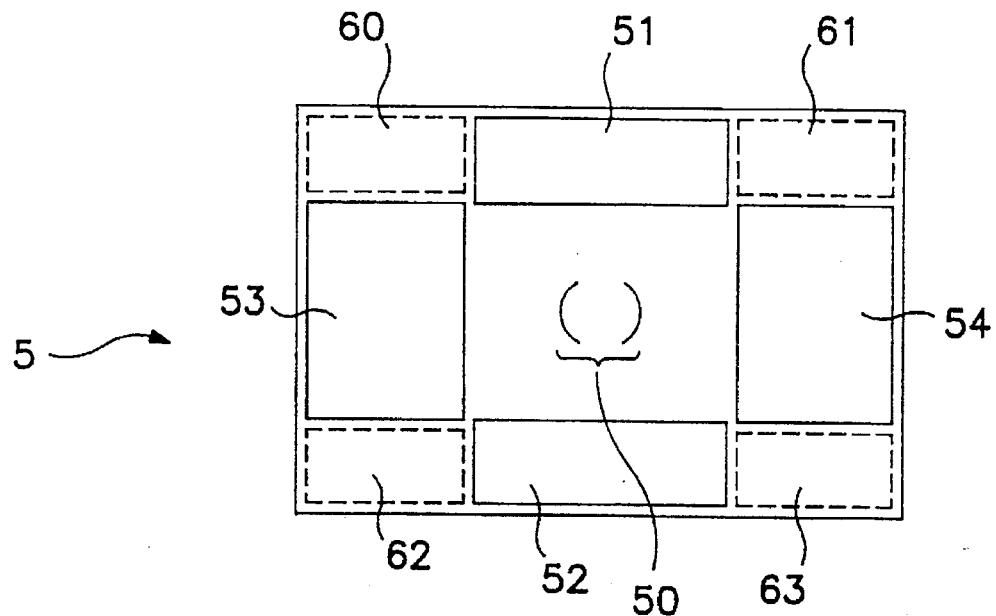
FIG. 5 is a diagram illustrating a viewfinder liquid crystal display according to an embodiment of the present invention.

In the embodiment as illustrated in FIG. 5, LCD display 5 includes transparent visual field sections 60–63. Visual field sections are optical sections through which light rays pass. Visual field sections 60–63 do not have liquid crystal segments and are configured such that the outside section of the field can also be seen in the panorama size and half size modes. Visual field sections 60–63 have the effects set forth below.

For example, when photography is performed at sea, there are cases wherein the horizon is not shown within viewfinder 4a when a subject is photographed in the panorama size mode. In such cases, it is difficult for the photographer to perform photography while levelling the camera. Particularly in the case of the panorama size mode, the print is horizontally oblong, and the result will be unattractive if a photograph is taken in a tilted position.

However, in the camera of the present embodiment, visual field sections 60–63 are attached, so that the photographer may visualize an amount of camera tilt when a horizon of water or land is seen in visual field sections 60–63. Photography in a tilted camera position can therefore be minimized.

Figure 6:
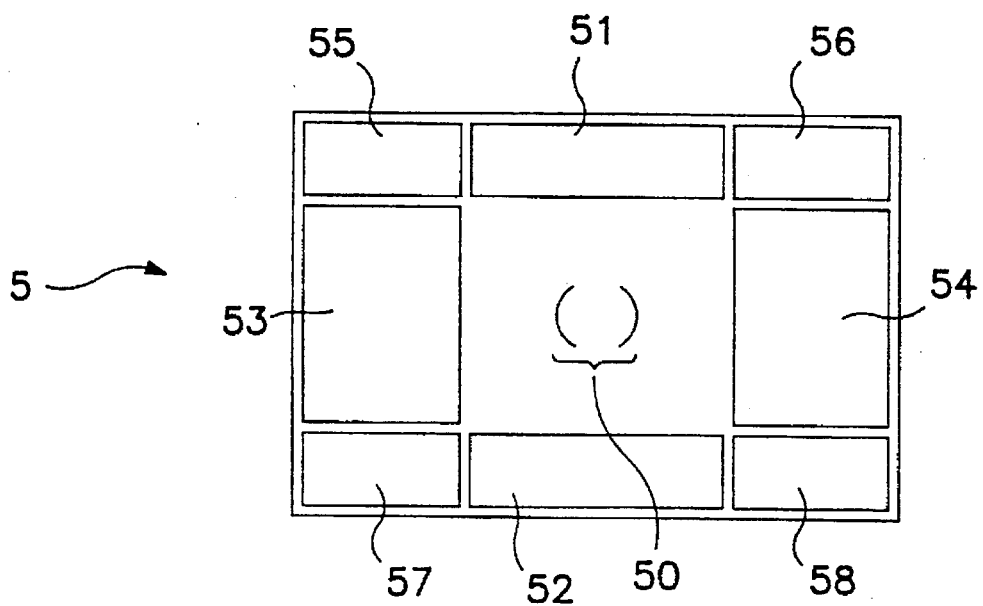
FIG. 6 is another diagram illustrating the viewfinder liquid crystal display of FIG. 5.

A second preferred embodiment, which is different from the first embodiment, will be explained next. The general configuration is the same as that of the first embodiment except for LCD display 5, so an explanation of repetitive material has been omitted. FIG. 6 will be used to explain LCD display 5.

FIG. 6 illustrates a display as seen from viewfinder 4a. A difference from LCD display 5 of the first embodiment is that optical sections 55–58 are attached. Optical sections 55–58 are selectively transparent. Optical sections 55–58 are liquid crystal segments of LCD display 5 which are displayed in black when turned ON.

Next, switching by CPU 20 according to the second embodiment among the standard size, panorama size and half size will be explained using FIGS. 3 and 4. Control of the second embodiment is almost the same as that of the first embodiment, so only the points which are different from the first embodiment will be discussed.

During reset processing of step 201, LCD display 5 is set to the standard size display. More specifically, segments 51–54 and optical sections 55≧58 are all turned OFF. At this time, nothing is displayed inside the viewfinder 4a except for the AF target 50. Reset processing control other than this is the same as in the first embodiment, so an explanation has been omitted.

When flow of FIG. 3 proceeds to step 105, LCD display 5 is set to the panorama display such that segments 51, 52 and optical sections 55–58 are turned ON for display. However, when flow of FIG. 3 proceeds to step 110, LCD display 5 is set to the half display. More specifically, segments 53, 54 and optical sections 55–58 are turned ON for display. Processing other than step 105 and step 110 is the same as in the first embodiment, and therefore an explanation has been omitted.

Optical sections 55–58, which are used in the viewfinder displays of both the panorama size and half size, are present in the second embodiment. Because optical sections 55–58 are shared in the panorama size and half size, i.e. panorama size photography and half size photography, a view through viewfinder 4a more closely represents the actual field to be photographed. For this reason, a range inside the viewfinder 4a to be photographed becomes clear, and even a novice photographer will be able to take photographs with a proper composition.

In the first embodiment and in the second embodiment, a number of LCD display segments may be placed on alternative sides of a viewing field to be photographed. This has the following benefits.

Figure 9:
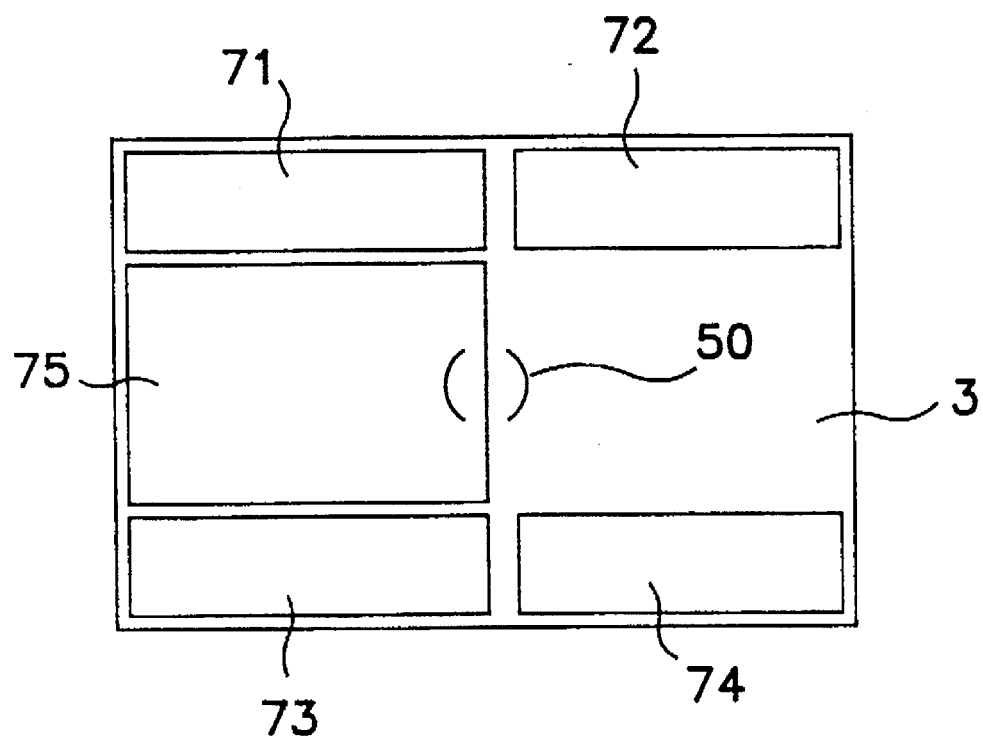
FIG. 9 is a diagram illustrating another example of a viewfinder liquid crystal display according to an embodiment of the present invention.

Suppose that the segments of LCD display 5 are arranged as illustrated in FIG. 9. In this case, segments 71–74 are displayed during panorama size photography, and segments 71, 73 and 75 are displayed during half size photography. Accordingly, in the case of half size photography, AF target 50 is displayed at an edge position of viewfinder 4a. Also, a view through viewfinder 4a becomes considerably altered from the standard size and panorama size displays, so that a photographer senses incongruity.

In the camera according to embodiments of the invention, the liquid crystal display segments for vertically oblong photography are positioned on both sides of the viewfinder so that the photographer does not sense incongruity. Also, AF target 50 can be displayed in the center.

The first and second embodiments of the present invention may be switched among the standard size, the panorama size and the half size. However, the present invention may also be applied to a camera which is able to photograph in a horizontally oblong size other than panorama size. The present invention may also be applied to a camera which is able to photograph in a vertically oblong size other than half size.

Moreover, the inventive concepts of the present invention may be applied to other optical devices such as digital cameras wherein film is replaced by light sensitive circuitry.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera producing at least three photograph image sizes comprising:

a viewfinder;

a switch selecting a photograph image size from the at least three photograph image sizes;

a plurality of aperture blades responsive to the switch and cooperating to define an aperture frame having a variable size corresponding to the selected photograph image size;

a plurality of optical segments disposed within the viewfinder and responsive to the switch to define a viewing area corresponding to the selected photograph image size;

a control unit connected to the switch and controlling movement of the plurality of aperture blades;

a first motor responsive to the control unit which cooperatively moves first and second aperture blades of said plurality of aperture blades to define a horizontally oblong photograph image; and a second motor responsive to the control unit which cooperatively moves third and fourth aperture blades of said plurality of aperture blades to define a vertically oblong photograph image.

2. The camera according to claim 1, wherein the first and second optical segments are disposed on alternate sides of the viewfinder and simultaneously respond to the switch to thereby define the viewing area.

3. The camera according to claim 1, wherein said first and second aperture blades are disposed within the camera optical system between the subject to be photographed and the photographic film and the second aperture blade cooperates with the first aperture blade to further define the optical image size corresponding to the defined viewing area.

4. The camera according to claim 1, wherein the first and second optical segments are disposed on alternate upper and lower sides of the viewfinder and said third and fourth optical segments are disposed on alternate right and left sides of the viewfinder, wherein all segments respond to the switch to further define the viewing area corresponding to the selected photograph size.

5. The camera according to claim 4, wherein the first, second, third and fourth optical segments are selectively transparent and said first and second optical segments are transparent when said third and fourth optical segments are non-transparent.

6. The camera according to claim 4, wherein the first, second, third and fourth optical segments are selectively transparent and said third and fourth optical segments are transparent when said first and second optical segments are non-transparent.

7. A camera having a viewfinder with a defined aperture frame producing at least three photograph image sizes comprising:

a switch selecting a photograph image size from the at least three photograph image sizes;

first, second, third and fourth aperture blades respectively disposed from the top, bottom, right and left of the defined aperture frame, wherein the first and second aperture blades move inwardly to define a horizontally oblong photograph image size and the third and fourth aperture blades move inwardly to define a vertically oblong photograph image size;

a plurality of optical segments disposed within the viewfinder and responsive to the switch to define a viewing area having a variable size corresponding to the variable aperture frame;

a control unit connected to the switch which controls movement of the first, second, third and fourth aperture blades;

a first motor responsive to the control unit which cooperatively moves the first and second aperture blades to define the horizontally oblong photograph image; and a second motor responsive to the control unit which cooperatively moves the third and fourth aperture blades to define the vertically oblong photograph image.

8. The camera according to claim 7, wherein:
said plurality of optical segments includes first and second optical segments respectively turning ON when said first and second blades are moved inwardly to thereby define a horizontally oblong optical viewing area.

9. The camera according to claim 7, further comprising:
a first gear connected to the first motor which transfers movement of the first motor to the first and second aperture blades; and a second gear connected to the second motor which transfers movement of the second motor to the third and fourth aperture blades.

10. The camera according to claim 7, wherein the plurality of optical segments are selectively opaque liquid crystal displays, and wherein said camera further comprises:
a control unit responsive to the switch which selects an optical segment of the plurality of optical segment to become opaque.

11. The camera according to claim 7, wherein:
said third and fourth aperture blades respectively define right and left surfaces of said aperture frame; and said third and fourth aperture blades move inwardly to thereby define a vertically oblong photograph image size.

12. The camera according to claim 11, wherein:
said plurality of optical segments includes third and fourth optical segments respectively turning ON when said third and fourth blades are moved inwardly to thereby define a vertically oblong optical viewing area.

13. The camera according to claim 7, further comprising:
a plurality of optical sections disposed within the viewfinder at respective corners thereof wherein each of said plurality of optical sections is adjacent to an optical segment of said plurality of optical segments.

14. The camera according to claim 13, wherein each of said plurality of optical sections is transparent.

15. The camera according to claim 13, wherein each of said plurality of optical sections and each of said plurality of optical segments is a liquid crystal display.

16. A camera having a viewfinder producing at least three photograph image sizes comprising:

a switch selecting a photograph image size from the at least three photograph image sizes;

first, second, third and fourth moveable aperture blades cooperating to define an aperture frame having a variable size which corresponds to the selected photograph image size, wherein said first and second aperture blades are disposed on alternate sides of the aperture frame and said third and fourth aperture blades are disposed on alternate sides of the aperture frame; and first, second, third and fourth liquid crystal segments disposed within the viewfinder and responsive to the switch to define a variable viewing area corresponding to the variable aperture frame, wherein the first and second liquid crystal segments are disposed on alternate sides of the viewfinder and the third and fourth liquid crystal segments are disposed on alternate sides of the viewing area;

a control unit connected to the switch which controls movement of the first, second, third and fourth aperture blades;

a first motor responsive to the control unit which cooperatively moves the first and second aperture blades to define a horizontally oblong photograph image; and a second motor responsive to the control unit which cooperatively moves the third and fourth aperture blades to define a vertically oblong photograph image.

17. A camera having an aperture frame, comprising:
first, second, third and fourth aperture blades respectively disposed from the top, bottom, right and left of the aperture frame to define a first aperture, wherein the first and second aperture blades move inwardly to define a second horizontally oblong aperture and the third and fourth aperture blades move inwardly to define a third vertically oblong aperture;

a first motor which moves said first and second aperture blades; and a second motor which moves said third and fourth aperture blades; and a viewfinder having a plurality of optical segments cooperating to define a viewing area respectively corresponding to the first, second and third apertures.

18. The camera according to claim 17, further comprising:

a plurality of optical sections disposed within the viewfinder at respective corners thereof wherein each of said plurality of optical sections is adjacent to an optical segment of said plurality of optical segments.

19. The camera according to claim 17, wherein:

said plurality of optical segments includes first and second optical segments respectively turning ON when said first and second blades are moved inwardly to thereby define a horizontally oblong optical viewing area.

20. The camera according to claim 19, wherein:

said plurality of optical segments includes third and fourth optical segments respectively turning ON when said third and fourth blades are moved inwardly to thereby define a vertically oblong optical viewing area.

* * * * *

UNITED STATES PATENT AND TRADEMARK OFFICE
CERTIFICATE OF CORRECTION

PATENT NO. : 5,659,832
DATED : August 19, 1997
INVENTOR(S) : Akio NISHIZAWA, et al.

It is certified that error appears in the above-identified patent and that said Letters Patent is hereby corrected as shown below:

Title page, item [56] U.S. Patent Documents, "5,252,055" s/b --5,257,055--.

Signed and Sealed this

Sixteenth Day of December, 1997

Attest:

BRUCE LEHMAN

Attesting Officer

Commissioner of Patents and Trademarks